July 10, 1951
J. G. BEVAN
2,559,704
SEWAGE TREATMENT
Filed Jan. 22, 1946
2 Sheets-Sheet 1
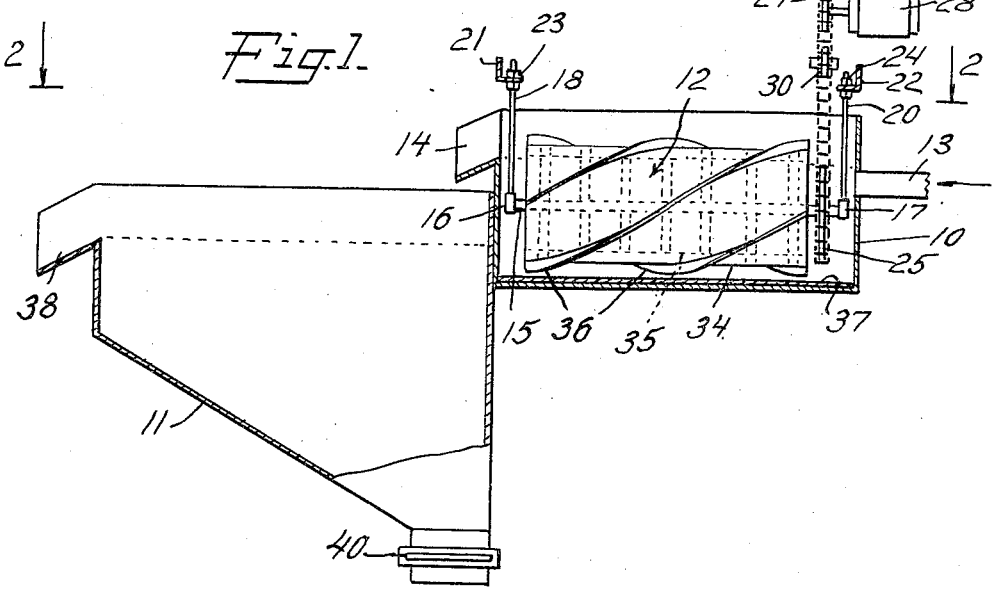
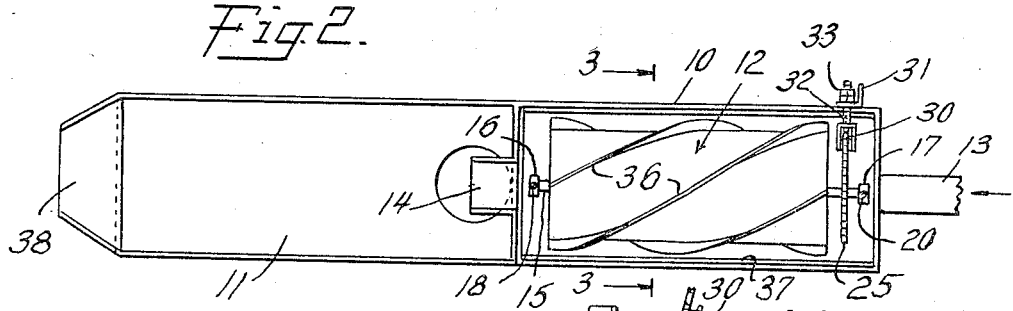
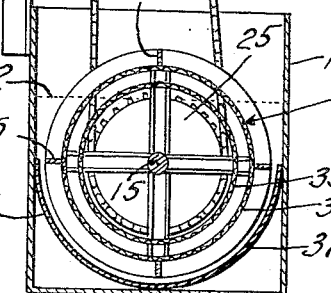
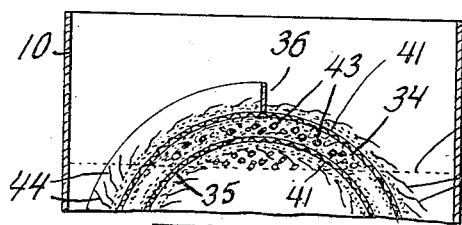
INVENTOR.
John G. Bevan
Pennie, Edmonds, Morton & Barrows
ATTORNEYS

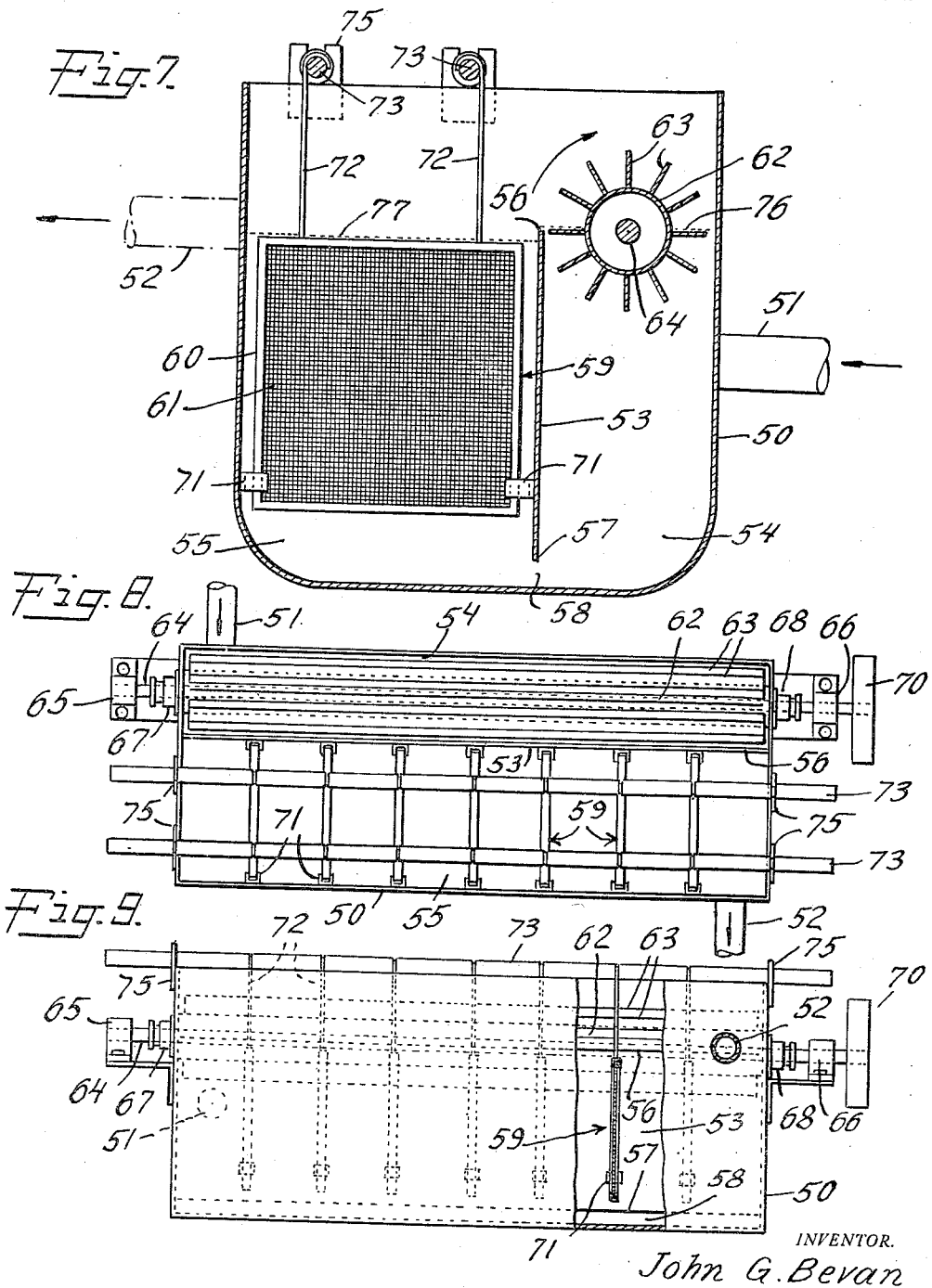

Patented July 10, 1951

2,559,704

UNITED STATES PATENT OFFICE 2,559,704

SEWAGE TREATMENT

John G. Bevan, New York, N. Y., assignor to Guggenheim Brothers, New York, N. Y., a copartnership Application January 22, 1946, Serial No. 642,686

2 Claims. (Cl. 210—8)

This invention relates to sewage treatment and has for an object the provision of an improved method or process for treating sewage and similar waste liquors. More particularly, the invention contemplates the provision of an improved biological method or process for removing putrescible matter from sewage and similar waste liquors.

This application is a continuation-in-part of my application Serial No. 550,554, filed August 22, 1944, now Patent Number 2,433,884, January 6, 1948.

Ordinary sewage contains organic putrescible matter and oxidizing or purifying bacteria. The putrescible matter is present both in the soluble or dissolved state and in the insoluble state as suspended solid matter. When the oxidizing bacteria are provided with oxygen, they tend to grow and propagate, the putrescible organic matter of the sewage being utilized as food for growth and being consumed and eliminated with consequent purification of the sewage.

The elimination of putrescible matter from impure liquids takes place in nature, as in flowing streams which permit the absorption of oxygen from the air to support the purifying bacteria, but the process is slow and can not be utilized advantageously for sewage purification in congested areas. Artificial sewage treatment processes have been designed to accelerate the purifying activities of the oxidizing bacteria. Thus, for example, in the trickling filter, the oxidizing bacteria are concentrated in an organic complex which develops naturally or spontaneously on the surfaces of the stones, and aeration is achieved by passing the sewage in thin films over the stones and in contact with the air. In the activated sludge process, aeration is achieved by injecting air under pressure into the mixture of liquid sewage and activated sludge.

The method or process of the present invention employs a naturally or spontaneously developed organic complex or matrix containing the oxidizing bacteria similar to that developed in the trickling filter process formed on a suitable support and which is aerated or otherwise subjected to the action of oxygen to provide oxygen for supporting the bacteria. The matrix containing the oxidizing bacteria is subjected to the action of oxygen (1) solely by means of oxygen dissolved in sewage brought into contact with the matrix, or (2) by means of aeration through intermittent exposure of the matrix to the air, as by alternately exposing the matrix to the sewage undergoing treatment and to the air, or (3) both by means of oxygen dissolved in sewage brought into contact with the matrix and by means of aeration through intermittent exposure of the matrix to the air. The bacteria are fed by means of putrescible matter contained in the sewage. Feeding, or exposure to food, is continuous when oxygen dissolved in the sewage is relied upon as the sole source of oxygen, while feeding or exposure to food is intermittent when intermittent aeration is relied upon to provide all or a part of the oxygen required by the bacteria.

A method or process of the invention is characterized by the establishment and maintenance of a balance between oxygen and food supplies available for the bacteria in order to provide food and oxygen to promote the growth and propagation of the bacteria and to effect the removal of dissolved putrescible mtater and the production of a settleable sludge containing suspended putrescible matter originally present in the sewage. In the preferred process of the invention, there is established and maintained a predetermined relationship between dissolved oxygen contained in the sewage and the biochemical oxygen demand of the sewage in order to promote the growth and propagation of the bacteria, prevent the sewage from becoming septic and produce a settleable sludge containing suspended putrescible matter originally present in the sewage.

The method or process of the invention may be carried out advantageously by providing or establishing a body of sewage to be treated in a suitable retention receptacle and contacting the sewage containing in the receptacle with the matrix containing the oxidizing bacteria. The matrix preferably is formed or positioned on a suitable solid support disposed within the receptacle in such a manner and in such a position as to provide for most effective contact of the sewage with the matrix thereon. The support may be so constructed and arranged as to be either stationary or movable relatively to the retention receptacle and the body of sewage therein during the course of the process. Sewage to be treated may be introduced into the retention receptacle either continuously or intermittently and treated sewage may be withdrawn from the retention receptacle either continuously or intermittently.

When a stationary matrix support or a matrix support which is maintained beneath the surface of the sewage continuously is employed, oxygen must be introduced into the sewage by auxiliary means such, for example, as a rotor or beater, an air blower, or an air injector. When a movable matrix support is employed, oxygen can be introduced into the sewage solely by means of the movable support, or auxiliary means such, for example, as a rotor, a beater, a blower or an injector may be employed in conjunction with the support. The movable support may be so constructed and arranged that it is alternately immersed in the sewage and exposed to the atmosphere above the sewage. When exposed to the atmosphere, the matrix on the support absorbs oxygen which is carried into and dissolved in the sewage when the support is returned to and immersed in the sewage. Also, small drops or mists or sprays of sewage created by the movement of the support in leaving and entering the sewage and in passing through the atmosphere may absorb oxygen which enters the sewage with drops of sewage present or formed initially or resulting from coalescence of minute liquid particles comprising mists or sprays. Furthermore, the matrix support may be so constructed and operated that it functions as a mechanical beater or agitator for incorporating air in the sewage by entrapment, or by riffling or agitating the surface to increase the area of exposure or in some other manner. A rotary matrix support, for example, which is so mounted as to be partially submerged in sewage and partially exposed to the atmosphere may be provided with ribs or vanes which, upon rotation of the support, cause it to function somewhat as a beater both to agitate the sewage and increase the area of contact with the atmosphere and to carry air beneath the surface of the sewage by entrapment. Ribs or vanes on a rotary support may be so formed and arranged that the support with its ribs or vanes functions as a stirrer or impeller for mixing the sewage.

In the preferred process of the invention, it is desirable to provide means for mixing the sewage in the retention receptacle to maintain a body of sewage of substantially uniform composition throughout.

Preferably, the introduction, withdrawal and mixing of the sewage in a process in which sewage is introduced and withdrawn continuously are so regulated as to obtain treated sewage having a predetermined biochemical oxygen demand and to maintain within the retention receptacle a body of sewage of substantially uniform composition throughout but of slightly decreasing concentration with respect to putrescible matter from the point of introduction to the point of withdrawal and having a biochemical oxygen demand not substantially higher than that of the withdrawn treated sewage. In such a process, the sewage to be treated and the treated sewage are introduced and withdrawn at spaced points and at substantially the same constant rate. The sewage is subjected to treatment for substantial periods of time, varying, for example, from one-half hour to one and one-half hours, and, consequently, the sewage to be treated or untreated sewage is introduced into a relatively very large volume of partially treated sewage with consequent substantially immediate dilution of the untreated sewage by diffusion and as the result of gentle mixing. Thus, the bacteria may be provided with food in relatively weak but substantial and healthy concentration, and under conditions such that violent changes or fluctuations in environment may be avoided and a substantially constant ratio of dissolved oxygen to putrescible matter, as indicated by biochemical oxygen demand, may be maintained. For example, in treating sewage according to the invention with a retention period of an hour, the volume of partly treated sewage in the retention receptacle must be sixty times the volume of untreated sewage introduced each minute. The untreated sewage is introduced continuously, and mixing can be carried out so that complete mixing is accomplished in not more than a minute. If a treated sewage having a biochemical oxygen demand not greater than twenty (20) is sought and withdrawn, the partly treated sewage in the receptacle will become stabilized with a biochemical oxygen demand of about twenty, and the addition to the partly treated sewage in the receptacle of untreated sewage having a normal biochemical oxygen demand of about eighty to one hundred twenty (80 to 120) will tend to increase the biochemical oxygen demand of the sewage undergoing treatment only about one to one and one-half (1.0 to 1.5) points or from twenty (20.0) to from twenty-one to twenty-one and one-half (21.0 to 21.5). Of course, the compositions of all parts of the body of sewage undergoing treatment will not be identical, but it will be apparent that they will be sufficiently similar and sufficiently controllable that an extremely healthy and uniform bacteria life can be maintained. Immediately adjacent the outlet for treated sewage, the biochemical oxygen demand of the sewage may be substantially lower than twenty (20), and it may vary over a substantial range, between about five (5.0) and twenty (20), for example. Such variations may be accounted for by variations in the quantity or profusion and the health of the matrix and bacteria which will depend upon the quantity of food as well as oxygen available. When putrescible matter is present in an amount such that the sewage has a biochemical demand above but not substantially higher than twenty (20), there is sufficient food present to support a heavy growth of matrix with oxidizing bacteria, and, when the sewage contains, as well, dissolved oxygen in amount not less than one part per million parts of sewage, there will be established and maintained a healthy, heavy and luxuriant growth of matrix. Substantially uniform growths of matrix will be maintained in portions of the retention receptacle in which the sewage constantly has a biochemical oxygen demand of twenty parts per million or higher. When sewage undergoing treatment contains putrescible matter equivalent to a biochemical oxygen demand substantially lower than twenty parts per million there is not sufficient food present to support a heavy growth of matrix. A heavy, healthy growth of matrix with oxidizing bacteria formed during a period of abundant food may cause the biochemical oxygen demand of the sewage to drop drastically in a subsequent period of less abundant food. Such a drastic drop results from depletion of food in the sewage which makes it impossible for the sewage to support the heavy matrix. The bacteria tend to die and matrix sloughs off, and the efficiency of removal of putrescible matter decreases. Consequently, putrescible matter again builds up in the sewage adjacent the point of withdrawal and an abundance of food again is present. As the result of re-establishment of an abundant food supply, the bacteria thrive and propagate, and a relatively heavy matrix develops again. In other words, in the operation of the process, it is possible that these will be cycles comprising periods of food abundance and periods of famine with corresponding heavy and light or scanty matrix growths and with relatively lesser and greater amounts of putrescible matter remaining in the withdrawn sewage. The process can be operated, however, so that sewage having a substantially constant composition with respect to putrescible matter can be obtained and withdrawn if a final effluent having a biochemical oxygen demand not substantially lower than twenty (20) is considered satisfactory. If a final effluent having a biochemical oxygen demand substantially lower than twenty (20) is sought, the qualities of the effluent and the matrix will fluctuate to some extent, as indicated.

(The biochemical oxygen demand referred to herein, unless otherwise specified, in each case indicates the results of a standard five day test involving incubation for five days at a temperature of about 20° C. and showing the biochemical oxygen demand (B. O. D.) in parts of oxygen per million parts of sewage, both by weight.)

The process of the invention may be carried out with continuous or intermittent introduction of sewage to be treated into the retention receptacle and with continuous or intermittent withdrawal of treated sewage from the retention receptacle. Regardless of the methods or procedures or practices of introduction and withdrawal, it is preferable to maintain substantially constant or uniform conditions with respect to concentrations of putrescible matter and dissolved oxygen in the sewage undergoing treatment in order to maintain a desirable oxygen-food balance.

The oxygen-food balance may be achieved by providing for the maintenance in the body of sewage undergoing treatment of dissolved oxygen in amount not substantially lower than about one part of oxygen per million parts of sewage (by weight) and providing for the maintenance in the sewage undergoing treatment of an average biochemical oxygen demand (B. O. D.) not exceeding or not substantially higher than about twenty parts of oxygen per million parts of sewage (by weight). Higher biochemical oxygen demands may be tolerated when greater quantities of dissolved oxygen are maintained.

When the oxygen in sewage undergoing treatment drops substantially below one part per million parts of sewage in a process in which an average biochemical oxygen demand not substantially greater than twenty (20) parts per million normally is being maintained, the matrix, which normally is rather light gray in color, gelatinous and even somewhat porous and which sloughs off the support readily, becomes darker in color and sticky, dense and tarry in consistency and it does not slough off the support readily. The withdrawn effluent becomes dirty-looking, resembling the effluent from an Imhoff tank, and a bad odor develops. The biochemical oxygen demand of the mixed sewage undergoing treatment and effluent rises to and remains in the range 40 to 60 parts per million even when the B. O. D. of the sewage is not greater than 80 parts per million. As a matter of interest, it might be noted that the matrix developed in the process of the invention varies in color to some extent, from a light, dull gray to gray with a brownish cast, depending on its state of oxidation, the more highly oxidized showing the brownish cast to the greater degree.

The operation goes bad slowly when the oxygen content is dropped below one part per million, but normal conditions can not be re-established until the oxygen content is raised above one part per million. Recovery is very rapid when the oxygen content is raised substantially above one part per million.

The data set forth in the following table illustrate the effects of various amounts of dissolved oxygen contained in sewage undergoing treatment on the removal of putrescible matter, as indicated by the biochemical oxygen demands of effluents obtained in treating, under otherwise substantially identical conditions, settled sewage having a biochemical oxygen demand of about eighty (80) parts of oxygen (by weight) per million parts of sewage (by weight):

| Dissolved Oxygen in Sewage Undergoing Treatment | Biochemical Oxygen Demand (B. O. D.) of Effluent |
| --- | --- |
| Parts per million | Parts per million |
| 0.1 | 43 |
| 0.2 | 36 |
| 0.3 | 27 |
| 0.4 | 28 |
| 0.5 | 27 |
| 0.6 | 27 |
| 0.8 | 19 |
| 0.9 | 16 |
| 1.1 | 18 |
| 1.3 | 13 |
| 1.5 | 17 |
| 1.6 | 12 |
| 1.8 | 16 |
| 2.0 | 15 |
| 2.1 | 13 |
| 2.5 | 9 |
| 2.8 | 18 |
| 3.0 | 13 |
| 3.4 | 15 |
| 4.0 | 8 |
| 4.4 | 7 |
| 5.3 | 7 |
| 5.6 | 6 |

From the above table, it will be noted that the production of an effluent having a B. O. D. lower than twenty parts per million can be accomplished when dissolved oxygen equivalent to not less than 0.8 part per million is present. While about 0.8 part per million seems critical and sufficient, I prefer to operate with a minimum of 1.0 part per million for greater stability.

The method or process of the invention may be employed for treating sewage of any type which is amenable to treatment. The sewage treated may be raw, entirely untreated, sewage, or it may be the effluent of any preliminary sewage treatment process in need of further purification which can be accomplished by the method or process of the invention. Usually, settled sewage will be treated in practicing the invention.

The process or method of the invention is further characterized by the fact that there is provided a relatively large ratio of active solids (matrix containing bacteria) to sewage undergoing treatment. This ratio may be as high as eighteen to thirty thousand (18,000 to 30,000) parts of solids to one million parts of sewage (both by weight) when the process is employed for treating normal municipal sewages. The important significance of this will be apparent when it is considered that the active solids present may be from about eight to twelve or more times as great as in processes of the type of the activated sludge process in the treatment of similar sewages. Greater amounts of active solids provide for more rapid removal of putrescible matter and, consequently, reduced or shorter times of treatment.

In a preferred method or process of the invention, the matrix containing the oxidizing bacteria is formed on a solid support, and the support with the matrix thereon is alternately immersed in the liquid sewage to be purified and exposed to the atmosphere (air) above the sewage.

It is the essence of this method or process of the invention that these alternate exposures to air and sewage are of short duration, measured in terms of minutes or seconds, as compared with other processes such as the contact filter process in which the periods of exposure to air and to sewage are measured in hours.

This process of the invention is furthermore distinguished from the activated sludge process by the passage of sewage over or in contact with a fixed matrix of bacteria, whereby the latter are intermittently fed and aerated in cycles measured in minutes or seconds instead of being alternately fed and aerated in cycles measured in hours with consequent starvation for substantial periods.

Any suitable support may be employed and any suitable means may be employed for effecting immersion in the sewage and exposure to the atmosphere. Preferably, the support is provided with a rough surface to which the organic complex or matrix may adhere readily. A support comprising wire mesh having about one-quarter inch to one inch or larger openings may be employed advantageously.

The process may be initiated simply by alternately immersing and exposing the support. The time of exposure to the atmosphere should be sufficient to permit proper oxygen absorption, and the time of immersion should be sufficient to permit effective adsorption of putrescible matter but not so long as to result in destruction of the bacteria from lack of oxygen. The process may be operated satisfactorily with exposure to the atmosphere for as short a period as about two (2) to five (5) seconds and immersion in the sewage for as short a period as about three (3) to seven (7) seconds. Any suitable relatively short periods of exposure and immersion may be employed. The maximum time of each exposure to the atmosphere and the maximum time of each immersion in the sewage should not exceed about thirty seconds, and maximum times of twenty seconds preferably are employed. Minimum times of one second preferably are employed. Alternate immersion and exposure at a controlled rate results in the development on the support of an organic complex or matrix in the form of gelatinous layers and stringers, and the process will reach equilibrium in about five to ten days. When wire mesh matrix supports are employed, the wires become coated with matrix. When fine wire mesh is employed, the matrix may form a continuous layer. When coarse wire mesh is employed, the matrix forms coatings on the wires, the openings remain, and stringers of matrix which float in the sewage grow on the coatings. The stringers increase the effective area of contact of the sewage and matrix.

The rate of speed at which the support is moved in the immersion and exposure operations should be controlled to permit the development and maintenance of a matrix of optimum qualities which may be lifted out from the sewage without substantial disruption and returned to the sewage substantially intact.

I have found that it is not advisable or desirable to operate a rotatable support at a rate which will provide a linear peripheral speed in excess of about two hundred fifty feet per minute (250 ft. per min.), as, at higher speeds, it is difficult and it may be impossible to develop and maintain a matrix of suitable depth or volume. As the speed increases and approaches 250 ft. per min., the matrix becomes tight and stringers disappear. The desirable peripheral speed is one lower than a beater speed in the use of which development of a matrix is not sought and might be objectionable. In the final analysis, the peripheral speed in any case will be limited by the ability to maintain a matrix of any kind on the rotor and, for practical purposes, by the ability to maintain on the rotor a matrix having desirable characteristics.

More rapid exposures and immersions permit air absorption during the most effective absorption ranges. A matrix having its oxygen supply largely depleted as the result of immersion will absorb oxygen rapidly upon exposure to the air, and a relatively short time of exposure to the atmosphere will permit absorption of a relatively large proportion of the total absorption capacity of the matrix.

When the rate of speed at which the support is moved in the immersion and exposure operations, the times of immersion and exposure and the strength of sewage being treated are maintained constant, the characteristics of the matrix will remain constant after equilibrium has been attained, but the composition of the matrix will tend to change constantly because the tendency to produce organic complex or matrix will not be arrested and because of the continuous resolution and destruction of bacteria and accumulation of material by the bacteria. Matrix containing dead, destroyed or ineffective bacteria will slough off constantly and be replaced by freshly formed matrix.

When the matrix is immersed in the sewage, the dissolved putrescible matter is adsorbed rapidly, providing the food for the growth and propagation of the bacteria and being consumed and eliminated in the immersion and exposure stages. Freshly formed organic complex or matrix which does not become attached to the support and matrix containing dead, destroyed or ineffective bacteria which sloughs off the support form flocs which become suspended in the sewage and entrain the insoluble matter (suspended solids) of the sewage to form a settleable sludge.

Treated sewage is removed from the vicinity of the support with the matrix thereon, and the sludge is separated from the accompanying liquor.

In another preferred method or process of the invention, the matrix containing the oxidizing bacteria is formed on a stationary support, and the sewage undergoing treatment is circulated in contact with the support and the matrix thereon. The support is immersed in the sewage constantly and means are provided for introducing air and incorporating and maintaining in the sewage the desired amount of dissolved oxygen.

The time of treatment and the volume of sewage treated relatively to the area of matrix employed will be determined by the results sought. Sewage is retained in a suitable treatment vessel and repeatedly subjected to the action of the matrix containing the oxidizing bacteria for a period of time sufficient to permit accomplishment of the degree of purification sought to be achieved. In treating the effluent from a preliminary settler fed with raw sewage from a typical United States municipality, good results can be obtained by treating the effluent for a period of one hour at a rate of flow of two to six gallons for each square foot of matrix surface. Elimination of about seventy-five to ninety percent or more of the putrescible matter of ordinary municipal sewages can be accomplished readily by means of treatment periods varying from about one-half hour to one hour.

Apparatus for carrying out the first preferred method of the invention comprises a receptacle for the retention of sewage to be purified, means for introducing sewage to be purified into the receptacle, means for withdrawing treated sewage from the receptacle, a support movably mounted adjacent the receptacle in such position as to be capable of being immersed in sewage contained in the receptacle and exposed to the atmosphere above sewage in the receptacle, and means for alternately immersing the support in sewage to be purified and exposing the support to the atmosphere. The apparatus may include, also, a clarifier into which treated sewage may be conducted to permit the separation of sludge from the accompanying liquor. A complete plant may include the usual screens and a preliminary settler for removing coarse materials.

The movable support preferably is in the form of a cylinder or drum open at both ends mounted within the retention receptacle for rotation about its horizontal axis. The bottom portion of the retention receptacle preferably is curved to conform substantially to the curvature of the cylinder, and the sewage inlet and outlet preferably are disposed adjacent the opposite ends of the cylinder to permit the continuous flow of sewage longitudinally of the cylinder.

The cylinder is so mounted as to be only partially submerged or immersed when sewage is flowing through the retention receptacle, and the mounting preferably is adjustable to permit variation in the degree of submergence or immersion. Variation in the degree of submergence or immersion may be accomplished in any other suitable manner if desired, as for example, by raising or lowering the level of the sewage through variation of the elevation of the outlet.

The cylinder preferably is provided with spirally arranged longitudinal ribs projecting from the outer surface which perform the five-fold function of (1) aiding in supporting the matrix, (2) aiding in maintaining sludge in suspension and producing flocculation, (3) introducing air into the sewage undergoing treatment to aid in establishing and maintaining in the sewage the desired dissolved oxygen concentration, (4) preventing excess growth of bacteria on the walls of the receptacle and (5) mixing incoming sewage with partially treated sewage to provide a body of sewage of substantially uniform composition but of slightly decreasing concentration with respect to putrescible matter from the inlet end to the outlet end of the retention receptacle.

The cylinder may consist of only one wall or it may comprise two or more walls, each being the wall of a cylindrical element and the elements being co-axial and telescoped.

The wall or walls of the cylinder may be formed of any suitable material. In the preferred form of apparatus, a foraminous material such as wire mesh is employed.

A variable speed drive preferably is provided to permit rotation of the cylinder at different speeds.

The invention will be better understood from a consideration of the following description in conjunction with the accompanying drawings in which Fig. 1 is an elevation, partly in section, illustrating apparatus suitable for use in practicing the invention;

Fig. 2 is a sectional plan taken substantially along the line 2—2 of Fig. 1;

Fig. 3 is a fragmentary sectional elevation taken substantially along the line 3—3 of Fig. 2;

Fig. 4 is an enlarged vertical section of the matrix support shown in Figs. 1 to 3;

Figs. 5 and 6 show enlarged segments of the wire mesh elements (screen) 34 and 35 and illustrate the manner in which the matrix forms on such elements;

Fig. 7 is a sectional end elevation of a modified form of apparatus suitable for use in practicing the invention;

Fig. 8 is a plan of the apparatus shown in Fig. 7; and

Fig. 9 is a side elevation, partly in section, of the apparatus shown in Fig. 8.

The apparatus shown in Figs. 1 to 4 of the drawings comprises a retention receptacle 10 and a clarifier 11 so disposed as to receive treated sewage from the retention receptacle 10.

A cylindrical support 12 for organic complex or matrix is adjustably mounted for rotation about its horizontal axis within the retention receptacle 10 with its opposite ends disposed adjacent the sewage inlet 13 and the sewage outlet 14. A central shaft 15 forming the axis of the cylindrical support has its ends mounted in bearings 16 and 17 carried by depending bearing supports 18 and 20. The bearing supports 18 and 20 are rod-like elements having their upper end-portions threaded and extending through openings in rigid brackets 21 and 22 wherein they are locked by means of pairs of lock-nuts 23 and 24, one of each pair being above and one below their respective brackets. The cylindrical support 12 may be raised or lowered by adjustment of the nuts 23 and 24.

A sprocket 25 is rigidly mounted on the central shaft 15 of the cylindrical support and connected by means of a driving chain 26 with a driving sprocket 27 rigidly mounted on an end portion of the shaft of a variable speed motor 28 connected with a suitable source of power (not shown).

An idler sprocket 30 is adjustably mounted on a rigid bracket 31 in operating engagement with the sprocket chain 26. The idler sprocket is carried by a horizontally disposed support 32 having a threaded end-portion extending through an opening in the bracket 31 and maintained in position therein by means of lock-nuts 33. The position of the idler sprocket 30 may be adjusted by manipulation of the nuts 33 to maintain the driving chain 26 sufficiently taut, the driving chain 26 being sufficiently long to permit adjustment of the cylindrical support to its lowermost desirable operating position, and the idler sprocket 30 being adjustable to maintain the driving chain properly taut when the cylindrical support is in its uppermost desirable operating position. Provision may be made advantageously to permit from about one-quarter to one-third of the surface of the cylindrical support to extend above the level of the sewage in the retention receptacle 10.

As indicated, the cylindrical support comprises two cylindrical elements 34 and 35 rigidly mounted on the shaft 15 in axial alignment and in telescoping relationship. The cylindrical elements 34 and 35 are formed of wire mesh.

The cylindrical support is provided with rigidly mounted, spirally arranged, horizontally extending ribs 36 projecting from its outer surface.

The lower portion of the retention receptacle 10 is curved as at 37 to conform to the curvature of the cylindrical support 12.

The clarifier 11 is provided with an overflow outlet 38 and a sludge discharge valve 40.

In the operation of the apparatus shown in Figs. 1 to 4, sewage, preferably the effluent from a preliminary settler (not shown), is introduced into the retention receptacle 10 through the inlet 13 at a controlled rate while the cylindrical support is being rotated at a controlled speed and in a direction such that the ribs 36 tend to move sewage contained in the retention receptacle toward the inlet end. An organic complex or matrix containing oxidizing bacteria commences to build up on the cylindrical elements 34 and 35 as indicated at 41 (Fig. 4) and, after several days, equilibrium is attained. Sewage flows continuously into the retention receptacle 10 where it is acted upon by the matrix 41, and treated sewage containing sludge in suspension flows continuously from the retention receptacle 10 through the outlet 14 to the clarifier 11. Sludge contained in the treated sewage settles in the clarifier 11 from where it may be withdrawn continuously or intermittently through the valve 40 and disposed of in any suitable manner. Purified sewage flows continuously from the clarifier 11 through the outlet 38 from where it may be conducted to any suitable point of disposal.

The matrix 41 is alternately submerged in sewage (below the sewage level indicated at 42 in the retention receptacle) and exposed to the atmosphere above the sewage.

As indicated in Fig. 4, water contained in the matrix drains therefrom in the form of small droplets (indicated by the numeral 43) when the matrix is exposed to the atmosphere. Draining of the water produces a suction effect which promotes contact of the atmosphere with the matrix. Also, the small droplets of liquid absorb oxygen from the atmosphere and promote the contact of oxygen with the matrix and the introduction of oxygen into the sewage. As indicated at 44, portions of the matrix form stringers each attached at one end to the main body or film of matrix on the support and which extend outwardly from the support when the matrix is immersed in the sewage and thus increase the effective area of contact of matrix and sewage.

Figs. 5 and 6 show enlarged fragmentary front and side sectional elevation views of matrix supports, such as the supports 34 and 35, comprising wire mesh with matrix 45 adhering to and surrounding or enveloping vertical metal wires 46 and the horizontal metal wires 47 and with stringers 48 of matrix projecting outwardly from main body of matrix adjacent to the wires.

The apparatus shown in Figs. 7, 8 and 9 of the drawings comprises a retention receptacle 50 provided with a sewage inlet 51 and a sewage outlet 52. The receptacle is divided longitudinally by a vertically extending partition wall 53 parallel with the side walls into two compartments 54 and 55. The upper edge 56 of the partition wall 53 is disposed below the upper edges of the walls of the receptacle, and its bottom edge 57 extends to a line adjacent to but spaced from the bottom of the receptacle 50 to form a passage 58 providing means of communication between the compartments 54 and 55. The upper edge 56 of the partition is disposed above the bottom of the outlet pipe 52.

A number of stationary matrix supports 59 each comprising a rectangular frame 60 and a foraminous element in the form of a wire mesh screen 61 are removably mounted in the compartment 55 on one side of the vertical partition 53 with their lower edges extending well below the upper edge 56 of the partition 53 and, preferably, with their upper edges also extending below the upper edge 56 of the partition 53. A rotor 62 provided with radially projecting blades or vanes 63 is mounted in the upper portion of the compartment 54 on the other side of the partition 53 with its longitudinal axis extending horizontally and in such position that it extends partly above and partly below the upper edge 56 of the partition 53.

The rotor 62 is supported on a horizontal shaft 64, extending parallel to two opposite walls of the retention receptacle 50 and to the partition 53, supported in bearings 65 and 66 and provided with packing glands 67 and 68. A pulley 70, which may be connected to a suitable variable speed source of power (not shown), is mounted on the shaft 64 to provide for rotation of the rotor.

The stationary matrix supports 59 comprising the frames 60 and the screens 61 are disposed angularly with respect to the vertical surfaces of the partition 53 so that the spaces between the matrix supports form channels or conduits extending between the adjacent face of the partition 53 and the adjacent face of the opposite side wall of the retention receptacle. Preferably, the matrix supports are disposed at right angles to the vertical surfaces of the partition 53 to provide relatively short channels or conduits.

The matrix supports 59 are attached to carrying rods 72 which are hooked over and depend from horizontally disposed grooved supporting rods 73 mounted above the retention receptacle in brackets 75 on the end walls of the retention receptacle. The lower end portions of the matrix supports 59 are mounted in guides 71 which, together with the grooves in the supporting rods 73 and the hooked carrying rods 72 function to maintain the matrix supports in proper spaced relationship.

As in the case of the apparatus shown in Figs. 1 to 4, a clarifier may be provided for receiving the effluent from the retention receptacle 50, and complete apparatus may include all essential sewage plant apparatus such, for example, as preliminary screens and settlers and means for disposing of clarified effluents and sludges.

In the operation of the apparatus shown in Figs. 7, 8 and 9, sewage is introduced into the retention receptacle 50 through the inlet 51, and treated sewage is withdrawn from the receptacle through the outlet 52. The rotor 62 is rotated at a rate of speed sufficient to cause circulation of the sewage undergoing treatment from the compartment 55 through the passage 58 beneath the partition 53, over the upper edge of the partition 53 which functions as a weir and through the passages between the matrix supports 59 and between the matrix supports 59 and the end walls of the retention receptacle. The action of the rotor tends to maintain the liquid sewage in the compartment 54 at a higher level than in compartment 55, as indicated by the liquid level lines 76 and 77 and, consequently, liquid sewage cascades over the upper edge of the partition 53. Air or oxygen is introduced into the sewage by the direct, moderate beater action of the rotor blades or vanes, by absorption in the stream of liquid sewage falling or cascading over the upper edge 56 of the partition 53 and through the air and by increased absorption in the body of sewage resulting from increased area of contact of sewage with air caused by the agitating effect of the cascading stream of sewage entering the body of sewage. The height of the cascade or fall need not be very great. A cascade or fall of any suitable height may be employed. Usually, a height of one or two inches will be satisfactory to permit the desired minimum degree of oxygen absorption. The rate of rotation of the rotor may be varied to vary the rate of flow of the sewage past and in contact with the matrix on the supports and over the weir and thus vary the rate of introduction of oxygen into the sewage.

The matrix builds up spontaneously on the screens 61, forming films which are continuous with respect to the faces of the screens when fine screens are employed and films which are discontinuous, foraminous or perforated with respect to the faces of the screens when coarse screens are employed. The matrix forms substantially continuous coatings or films on the individual wire elements making up the screens. Stringers of matrix form and extend outwardly from the films or coatings of matrix on the screens, floating in the liquid sewage and effectively increasing the area of contact of liquid sewage with matrix and oxidizing bacteria. Circulation of sewage should not be so violent as to destroy or prevent the formation of stringers. On the contrary, circulation should be sufficiently gentle to promote stringer formation and produce the optimum area of contact of matrix with sewage. The matrix supports 59 should be spaced apart sufficiently to prevent stringers from adjacent supports from joining and growing together. When the stringers from adjacent supports join and grow together, they provide a basis or foundation for additional growth of matrix between the supports with the result that the passages between the supports may become clogged and circulation of the sewage may be interfered with and the efficiency of contact of sewage and matrix thereby reduced. Spacing apart of the matrix supports a distance of about seven inches permits effective operation of the process. Circulation of the sewage must be fast enough to remove and keep in suspension matrix which sloughs off the matrix supports.

I claim:

1. The improvement in the treatment of sewage containing suspended and dissolved putrescible matter which comprises forming a matrix containing oxidizing bacteria on a suitable support, flowing sewage to be purified through a suitable receptacle, alternately immersing in the flowing sewage and exposing to the atmosphere the support with the matrix of oxidizing bacteria thereon to alternately provide food and oxygen to promote the growth and propagation of the bacteria and to effect the removal of dissolved putrescible matter and the production of a settleable sludge containing suspended putrescible matter originally present in the sewage, the times and rates of immersion in the sewage and exposure to the atmosphere being such as to permit the maintenance on the support of a suitable matrix of oxidizing bacteria, the time of each exposure to the atmosphere being not longer than about five seconds and the time of each immersion in the sewage being not longer than about seven seconds, and separating the settleable sludge from the accompanying liquor.

2. The improvement in the treatment of sewage containing suspended and dissolved putrescible matter which comprises forming a matrix containing oxidizing bacteria on a suitable support, flowing sewage to be purified through a suitable receptacle, alternately immersing in the flowing sewage and exposing to the atmosphere the support with the matrix of oxidizing bacteria thereon to alternately provide food and oxygen to promote the growth and propagation of the bacteria and to effect the removal of dissolved putrescible matter and the production of a settleable sludge containing suspended putrescible matter originally present in the sewage, the times and rates of immersion in the sewage and exposure to the atmosphere being such as to permit the maintenance on the support of a suitable matrix of oxidizing bacteria, the time of each exposure to the atmosphere being not longer than about two to five seconds and the time of each immersion in the sewage being not longer than about three to seven seconds, and separating the settleable sludge from the accompanying liquor.

JOHN G. BEVAN.

REFERENCES CITED

The following references are of record in the file of this patent:

UNITED STATES PATENTS

| Number | Name | Date |
|---|---|---|
| 1,343,797 | Stott et al. | June 15, 1920 |
| 1,666,164 | Chappell | Apr. 17, 1928 |
| 1,717,780 | Imhoff | June 18, 1929 |
| 1,811,181 | Maltby | June 23, 1931 |
| 2,188,162 | Schulhoff | Jan. 23, 1940 |
| 2,388,795 | Montgomery | Nov. 13, 1945 |
| 2,389,357 | Griffith | Nov. 20, 1945 |

FOREIGN PATENTS

| Number | Country | Date |
|---|---|---|
| 247,769 | Great Britain | Feb. 25, 1926 |
| 784,706 | France | May 6, 1935 |
| 50,963 | Switzerland | Mar. 22, 1910 |
| 193,633 | Switzerland | Jan. 27, 1938 |